United States Patent
Asawa et al.

(10) Patent No.: US 7,362,721 B1
(45) Date of Patent: Apr. 22, 2008

(54) SYSTEM AND METHOD FOR PROVIDING FAULT AND ERROR TOLERANT COMMUNICATIONS IN A NETWORK ENVIRONMENT

(75) Inventors: Manjari Asawa, Cupertino, CA (US); Tmima Koren, Cupertino, CA (US); Jagdish V. Sonti, Cupertino, CA (US); Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 547 days.

(21) Appl. No.: 10/902,367

(22) Filed: Jul. 28, 2004

(51) Int. Cl.
*H04Q 7/00* (2006.01)
(52) U.S. Cl. .............. 370/328; 370/493; 370/389; 455/418; 455/420
(58) Field of Classification Search .............. 370/328, 370/493, 389; 455/420, 418
See application file for complete search history.

(56) References Cited

U.S. PATENT DOCUMENTS

| | | | |
|---|---|---|---|
| 5,894,557 A | 4/1999 | Bade et al. ............ 395/200.58 |
| 6,134,245 A | 10/2000 | Scarmalis ................ 370/474 |
| 6,192,051 B1 | 2/2001 | Lipman et al. ............ 370/389 |
| 6,363,065 B1 | 3/2002 | Thornton et al. ......... 370/352 |
| 6,400,722 B1 | 6/2002 | Chuah et al. ............ 370/401 |
| 6,477,595 B1 | 11/2002 | Cohen et al. ............ 710/105 |
| 6,512,754 B2 | 1/2003 | Feder et al. ............. 370/338 |
| 6,512,773 B1 | 1/2003 | Scott ................... 370/395.61 |
| 6,765,931 B1 * | 7/2004 | Rabenko et al. .......... 370/493 |
| 2005/0002364 A1 * | 1/2005 | Ozer et al. ............... 370/338 |
| 2005/0074012 A1 * | 4/2005 | Garakani et al. ....... 370/395.21 |
| 2005/0226241 A1 * | 10/2005 | Yang et al. .............. 370/389 |

* cited by examiner

*Primary Examiner*—Danh Le
(74) *Attorney, Agent, or Firm*—Baker Botts L.L.P.

(57) ABSTRACT

An apparatus for providing fault and error tolerance in a network environment is provided that includes an aggregation node associated with a base station controller and operable to receive a packet that includes an error. A portion of the packet is discarded, the packet being associated with a communications flow. The aggregation node being further operable to perform a selected one of injecting a subframe into the communications flow and playing one or more previous frame bits from a frame memory in response to the error.

17 Claims, 3 Drawing Sheets

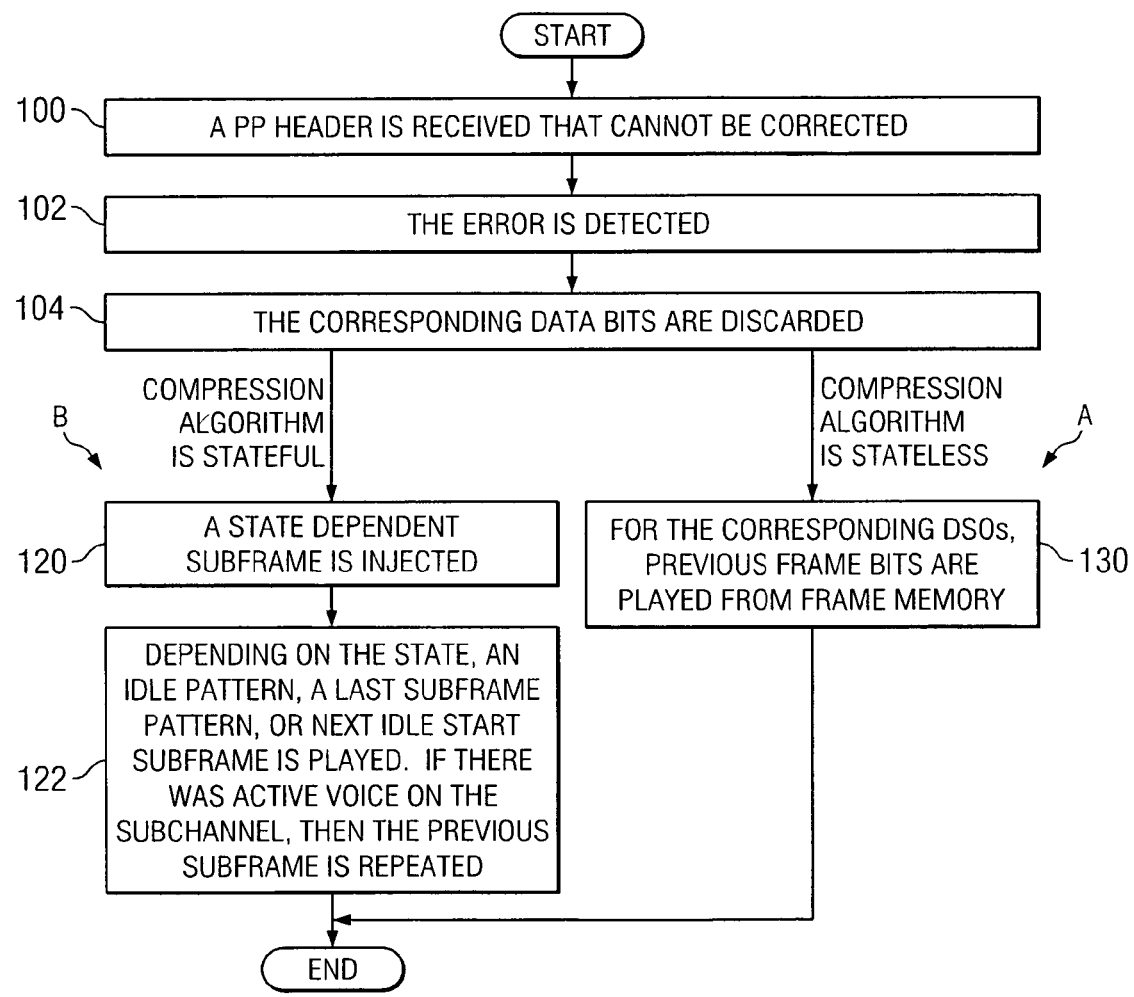

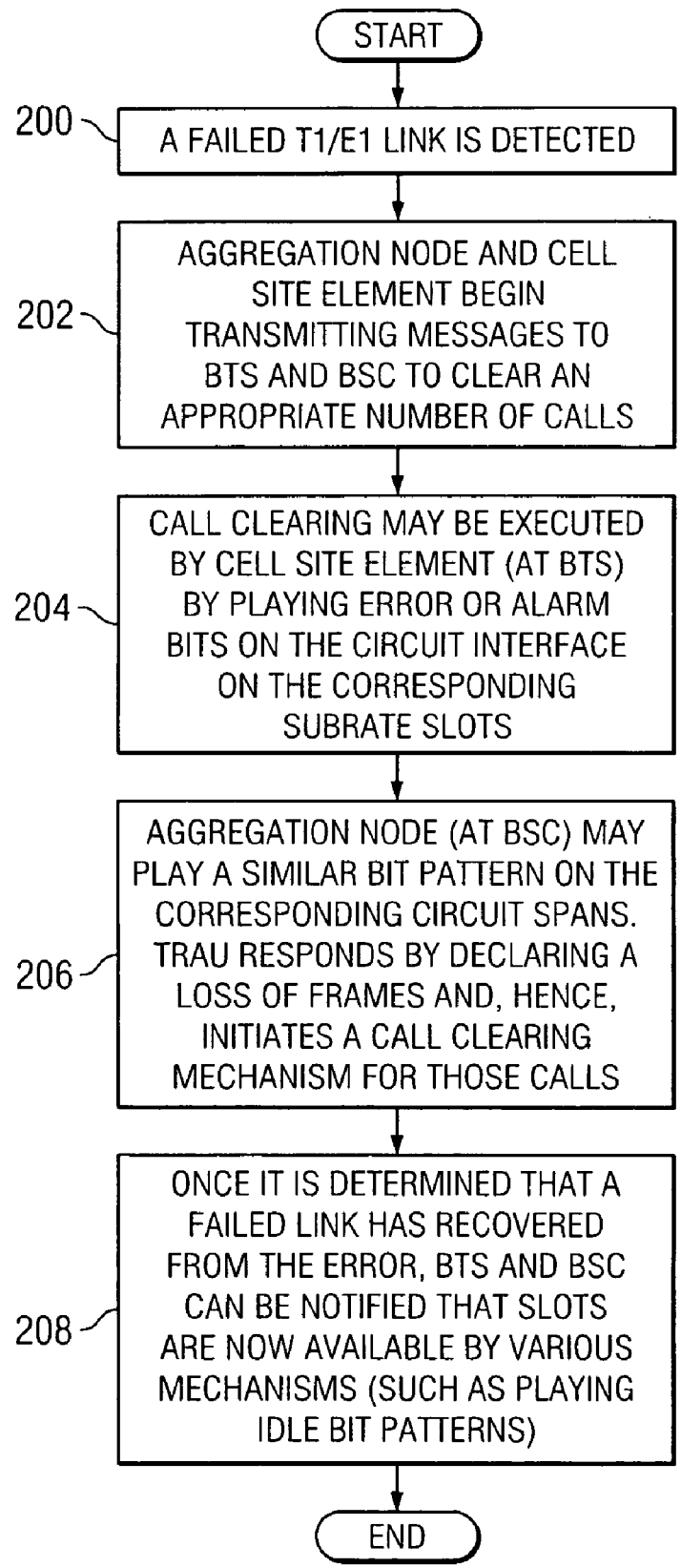

SYSTEM AND METHOD FOR PROVIDING FAULT AND ERROR TOLERANT COMMUNICATIONS IN A NETWORK ENVIRONMENT

TECHNICAL FIELD OF THE INVENTION

The present invention relates in general to the field of communications and, more particularly, to a system and a method for providing fault and error tolerant communications in a network environment.

BACKGROUND OF THE INVENTION

Communication systems and architectures have become increasingly important in today's society. In compression scenarios, network operators generally seek to produce high percentages of gain in compression for any given transport that is being implemented. In a given architecture that supports certain types of compression, it is common that a number of long haul (e.g. T1/E1) links are used between network devices (e.g. routers) that support the compression and decompression functions. In the course of compression, three links could be mapped to two long haul packet links, or four links could be mapped to three long haul packet links, thereby affording cost saving to the network operator.

To achieve compression, slots from various links are generally multiplexed on each long haul link. During such compression operations, long haul link failures can be problematic. Since the traffic from all the links is generally multiplexed and because the multiplexed traffic is then sent over any of the long haul links in a non-deterministic way, all the associated calls suffer deterioration as the remaining long hauled links get overloaded. If about one third of the frames are dropped for each call, frame synchronization will be lost for each call. In addition, such a scenario would most likely lead to call dropping issues. Clearly, complete outage due to the loss of one (or just a few links) is not desirable. Accordingly, the ability to provide a communications system that minimizes the effects of link failures, packet losses, and call drops presents a significant challenge for network operators, service providers, and system administrators.

SUMMARY OF THE INVENTION

From the foregoing, it may be appreciated by those skilled in the art that a need has arisen for an improved fault and error tolerant approach that optimizes data exchanges in a communications environment. In accordance with one embodiment of the present invention, a system and a method for accommodating fault and error in a communications environment are provided that substantially eliminate or greatly reduce disadvantages and problems associated with conventional fault and error tolerant techniques.

According to one embodiment of the present invention, there is provided an apparatus for providing fault and error tolerance in a network environment that includes an aggregation node associated with a base station controller and operable to receive a packet that includes an error. A portion of the packet is discarded, the packet being associated with a communications flow. The aggregation node being further operable to perform a selected one of injecting a subframe into the communications flow and playing one or more previous frame bits from a frame memory in response to the error.

Certain embodiments of the present invention may provide a number of technical advantages. For example, according to one embodiment of the present invention, a communications approach is provided that significantly enhances fault and error tolerance in network communications. The present architecture also offers a remedy for a sequence of frame losses due to failed links. The present configuration minimizes performance problems and maximizes the quality of calls in many packet loss, link failure, and call drop scenarios. Moreover, certain functions of the present invention solve congestion issues and address the problem of complete site outage. Such issues generally arise in the context of a loss of one or a few long haul links, which can be problematic for any network operator.

Other technical advantages associated with such a communication system architecture relate to its ability to provide a recovery mechanism for a few lost or erred frames. In the event of the loss of a packet backhaul communication span, the provided architecture can quickly alleviate congestion experienced on the packet backhaul. The offered configuration can also prohibit new calls from severely degrading performance of the entire system. The proposed schemes are simple to implement and can apply to virtually any compression network arrangement. Additionally, such fault and error tolerant techniques may be achieved with minimal modifications to an existing/enterprise architecture. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIGS. 2A and 2B are simplified flowcharts illustrating a series of example steps associated with the communication system.

DETAILED DESCRIPTION OF THE INVENTION

Figure 1:
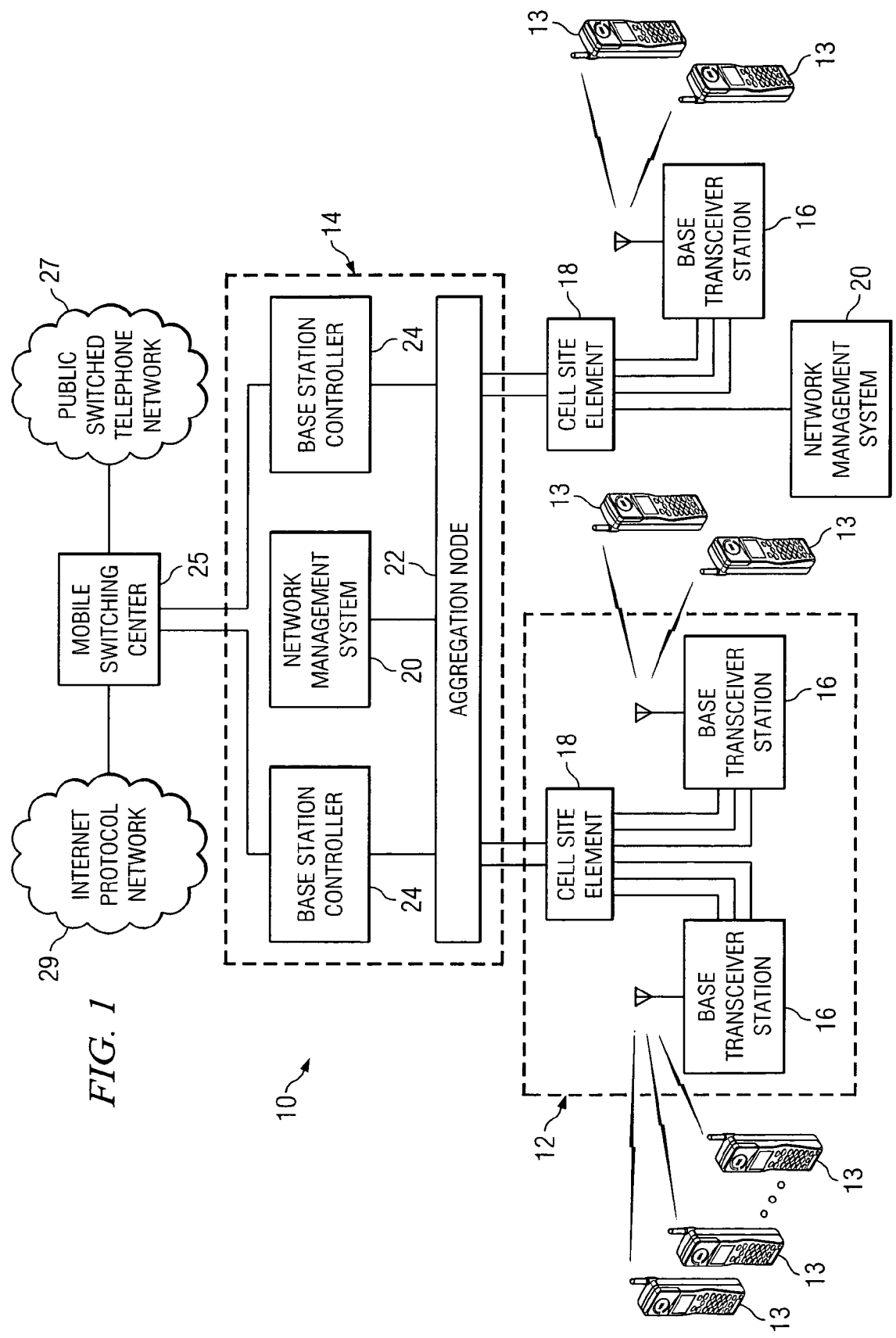
FIG. 1 is a simplified block diagram of a communication system for providing enhanced fault and error tolerance in a network environment.

FIG. 1 is a simplified block diagram of a communication system 10 for providing enhanced fault and error tolerance in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with a 3G network, where 3G equivalent networking equipment is provided in the architecture. Communication system 10 is versatile in that it may be used in a host of communications environments such as in conjunction with any time division multiple access (TDMA) element or protocol for example, whereby signals from end users, subscriber units, or mobile stations 13 may be multiplexed over the time domain.

In accordance with the teachings of the present invention, a fault and error tolerant approach is provided that offers schemes that allow a recovery from occasional frame error/ loss. The offered architecture also offers a remedy for a sequence of frame losses due to failed links. Communication system 10 minimizes performance problems and maximizes the quality of calls in such scenarios. The operations of communication system 10 offer a number of important advantages. For example, the proposed schemes solve congestion issues and address the problem of complete site outage. These issues generally arise in the context of the loss of one or a few long haul links. Moreover, communication system 10 can provide the recovery mechanisms for a few lost or erred frames. In the event of the loss of a packet backhaul span, communication system 10 quickly alleviates congestion experienced on the packet backhaul. The provided architecture also prohibits new calls from severely degrading performance of the entire system. The proposed schemes are simple to implement and can apply to virtually any GSM multiplex (GSMmux) compression arrangement.

In any network system that supports compression (e.g. time division multiplexed (TDM)-based GSM flows), IP network 29 may be used for back-haul transport. It is generally common that a number of long haul links are used between devices that support the compression and decompression functions. In the case of FIG. 1, aggregation node 22 (the BSC device) and cell site element 18 (the BTS device) would be implicated. Compression operations may allow three TDM links to be mapped to two long haul packet links, four TDM links could be mapped to three long haul packet links, etc. The effective mapping of such links affords cost savings for the network operator.

During the course of compression, slots from various TDM links are generally multiplexed on long haul links. Communication system 10 addresses the case when one (or more, but not necessarily all) of the long haul links fail. Since the traffic from all the TDM links is multiplexed and the multiplexed traffic is sent over any of the long hauled links in a non-deterministic way, all the calls suffer deterioration as the remaining long hauled links get overloaded. A conservative estimate may yield that about one third of all frames are dropped for each call. This results in frame synchronization being lost for each call. In addition, such a scenario could most likely lead to call dropping issues for the site. Network operators would rather not offer services to their customers that produce complete outages due to the loss of only one or a few links. Communication system 10 offers a way to avoid such complete outages and minimizes the effects of such problems.

To elaborate further, the compression and decompression functions executed by communication system 10 take frames of GSM traffic (e.g. 320-bit GSM8.60/8.61) and converts them to datagrams on an IP network (e.g. user-datagram protocol (UDP)/IP payload, real-time protocol (RTP)/UDP/IP payload). To support the multitude of T1/E1 physical interfaces between the network devices (e.g. routers), it is common practice to use either IP routing (e.g. static IP routes, open shortest path first (OSPF), equal-cost routing, etc.) or a multi-link protocol (MLP) to bond the physical interfaces to one virtual interface from the perspective of the compressed GSM traffic. In either case, if one of these links should fail, then all the calls carried over the multilink interface between aggregation node 22 and cell site element 18 will suffer either degradation (due to increased delay caused by congestion) and/or call failure/drops (e.g. due to insufficient quantity of packets, loss of packets, or untimely arrival of traffic).

In accordance with the teachings of the present invention, communication system 10 offers schemes to solve the above-described problems, as well as solves the problem where few frames are lost or erred on the link occasionally (as opposed to complete outage). For the complete outage scenario, communication system 10 can actively detect this condition and then take remedial action so as to limit the adverse impact of a lost E1/T1 link. In particular, communication system 10 is operable to selectively take away calls. This may be performed by playing alarm patterns toward the base transceiver station side (which causes base transceiver station 16 to tear down the call) and a non-valid frame pattern on the base station controller side (which causes transcoding and rate adaptation unit (TRAU) to declare a loss of synchronization). In executing these functions, only a few selected users will suffer loss, which stands in contrast to a complete outage that affects a greater number of end users.

Thus, for the lost traffic/frame scenario, communication system 10 can respond by proposing to repeat the previous frame. Communication system 10 may also demonstrate that it is the most effective error-recovery policy among the class of one state memory policies. Additional details related to the operations of communication system 10 are provided below in conjunction with the discussion of FIGS. 2A-2B.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface.

Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a TRAU) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communications link or element operable to facilitate data exchanges. A backhaul connection between cell site element 18 and aggregation node 22 may also include a T1/E1 line or any suitable communications link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, layer one based (e.g. TDM, GSM, 8.60) or layer two based (e.g. Frame Relay, high level data link control (HDLC), asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the layer two based traffic that have a common destination. The multiplexed payloads, as well as any payloads extracted from the network management system IP or Ethernet traffic, may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within, or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/internet protocol (TCP/IP) communication language protocol in a particular embodiment of the present invention. However, IP network 29 may alternatively implement any other suitable communications protocol for transmitting and receiving data packets within communication system 10.

It is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

In one embodiment, appropriate software may be included in aggregation node 22 and cell site element 18 in order to offer the fault and error tolerant operations described herein in this document. Alternatively, each of these elements may also include any suitable hardware, processors, objects, ASICs, or elements operable to execute one or more of their functionalities. Additionally, such elements may be inclusive of suitable algorithms that operate to distribute data properly in a communications environment.

FIGS. 2A and 2B are simplified flowcharts illustrating a series of example steps associated with a method for providing a fault and an error tolerant architecture in a communications environment. Both of the flowcharts of FIGS. 2A and 2B are described in the context of a simple voice call initiated by mobile station 13. This has only been offered for purposes of example and teaching and, accordingly, should be construed as such. In no way should such a discussion inhibit the broad scope of the present invention.

In FIG. 2A, mobile station 13 or mobile switching center (MSC) 25 may initiate a voice call. These two elements may negotiate a time slot or DS0 within the backhaul between base transceiver station 16 and base station controller 24. These elements may then be assigned for that particular voice call. In this example scenario, mobile station 13 may begin to translate analog signals from a suitable interface (such as a microphone for example) of a handset into a GSM (full or half rate) signal. This is a digital representation of the voice data that may be effectuated in a 20 ms period, which represents the packetization period of the system. (Note that the packetization period of the GSM system (20 ms) is different from the packetization period of the transport/compression/decompression system or "frame period," which has a much lower packetization period (e.g. 5 ms). This may be done by mobile station 13 in cooperation with a transcoder.

The voice frame from base station controller 24 or base transceiver station 16 is transmitted on the TDM network that connects to cell site element 18 or aggregation node 22. Thus, in this example embodiment, the end user is speaking into mobile station 13, which converts analog voice signals into GSM full rate or half rate digital samples. The samples are transmitted on an eight or a sixteen kilo-bit radio time slot or channel to the base transceiver station 16 over the air. Base transceiver station 16 transfers that frame over the A-bis backhaul interface toward cell site element 18.

Using this background or pretext, two example flows ('A' and 'B') are described with reference to FIG. 2A. The functions of aggregation node 22 and/or cell site element 18 may include two parts. These two parts (described in more detail below), when combined, solve the problems of lost or erred frames as well as failed E1 links. In many GSM compression schemes, there is a UDP or an RTP packet that multiplexes frames from multiple GSM calls together. The packet contains a common header section (generally referred to as "payload present" or PP field). The PP field contains one (or more) bits that indicate the presence and/or type of payload that is present in the remainder of the packet, which corresponds to this particular GSM subrate channel/DS0. A frame buffer is added that contains memory of the last GSM frame (or sub-frame) that was received from the compressor and played out to the GSM equipment (cell site element 18 and aggregation node 22). The frame memory generally has a capacity for one GSM frame (or sub-frame).

In the first part and at step 100, a PP header is received that cannot be error corrected. At step 102, the error can be properly detected. At step 104, the corresponding data bits are discarded. This is because it is not possible to determine (with any type of certainty) which data bits correspond to which sub rate DS0. In such a case, there are two scenarios to address. The two scenarios, 'A' and 'B' illustrated in FIG. 2A relate to which compression algorithms are used.

Scenario A deals with situation where the algorithm is stateless. At step 130, for the corresponding sub rate DS0s, previous frame bits are played from the frame memory. This operation also prevents E1s from losing traffic in the case of missing a single frame. Only DS0s for which a frame was lost are possibly affected.

Scenario B deals with the situation where the algorithm is stateful; this results in a state dependent subframe being injected at step 120. In the case where it was known (depending on the state) that an idle voice frame was being transmitted then (depending on the state an idle pattern) the last subframe pattern or the next idle start subframe is played. If there was active voice on the subchannel, then the previous subframe is repeated. This operation is illustrated in step 122.

FIG. 2B is a simplified example flowchart that illustrates the second part of the solution. When a failed T1/E1 link is detected at step 200, then aggregation node 22 and cell site element 18 (at both the BSC and the BTS) actively send messages to the BTS and BSC (by playing alarm bits or appropriate signals) to clear (i.e. end or terminate) the appropriate number of calls at step 202. The number of calls to be cleared depends on the load of the network and available capacities of the non-failed links.

For example, suppose N is the total number of call carrying capacity with all the backhaul links (b) being active. Further suppose f links fail (where f<b). In addition, assume that n represents the number of active calls present, P denotes the total number of payload mask bits per subframe, and S denotes the size of each subframe. Thus, the number of calls that should be cleared when all the calls are sub-multiplexed at the same rate are provided by the following equations.

If $n <= N*(b-f)/f - P*f/S*b$, then the appropriate response is to do nothing, as the call carrying capacity is more than the number of calls being carried. If $n > N*(b-f)/f - P*f/S*b$, then clear $n - N*(b-f)/f - P*f/S*b$ number of calls, as currently more calls are being carried than the reduced capacity. Note that above formula can easily be modified for cases where variable rate sub-multiplexing and/or variable rate PP masks are used.

The calls to be cleared can be decided statically, based on a fixed deterministic algorithm that is included at both cell site element 18 and aggregation node 22 in which case no signaling is required between the two to indicate exactly which subrate DS0s need to be cleared. If the algorithm is not deterministic, then the calls to be cleared are negotiated between aggregation node 22 and cell site element 18.

The call clearing can be done by cell site element 18 (at the BTS end) playing an ERROR pattern (e.g. 000000 . . . ) or an alarm pattern on the circuit interface towards the BTS on the corresponding (subrate) DS0 slots. This is illustrated by step 204. Aggregation node 22 (at the BSC side) can play a similar bit pattern (i.e. not a valid voice or data frame) on the corresponding (sub rate DS0s) circuit spans. This causes the TRAU to declare a loss of frames and, hence, initiate a call clearing mechanism for those calls, as illustrated by step 206. A preferential mechanism can readily be built into the scheme for selecting which subrate DS0s get cleared (and, thereby, the type of traffic: voice, signaling, data, etc). It is assumed that no call admission control function exists in this solution. Therefore, the only way to clear the calls is by transmitting patterns indicated above to clear selected calls on specific DS0s. This will quickly alleviate congestion experienced on the packet backhaul, as well as precluding new calls from severely degrading system performance. This would minimize the adverse impact of the loss of a packet backhaul span.

If the number of required calls to be cleared is more than the capacity of an integer multiple of an entire TDM channelized T1/E1 circuit (towards BTS or BSC), or when it is not possible to play error patterns on individual subrate DS0s, then required number of entire circuit TDM links can be taken down by playing E1/T1 alarms to avoid congestion and performance degradation of remaining packet long haul backhaul links.

In the scheme above, if knowledge of the call type is maintained, then the knowledge of call types can also be used to prioritize the calls being dropped. One way to have knowledge of call types is to monitor the signaling or operations and management (O&M) traffic on the GSM A-bis interface and ascertain (e.g. during call setup), which type of call is being assigned on the subrate DS0. The type of call on each subrate DS0 can be written into a database during call origination/termination and this database can be accessed in order to decide the subrate DS0s to be cleared.

Once it is detected that a failed link has recovered from the error, then it is important to indicate to the BTS and the BSC that those slots are now available using various mechanisms. For example, to achieve this, idle patterns could be sent on the subrate DS0 slots (that were used to propagate alarm or error patterns) in order to clear the calls in second part described above. Now the BTS and the BSC can use those slots for the new calls. This process is illustrated by step 208.

The first part of the process outlined above is executed because it can be shown that repeating a previous frame is optimal among the class of policies, which do not contain more than one frame memory. It is easy to see that the IDLE subrate DS0s will not notice any performance problem with this scheme. Subrate DS0s with IDLE frames also may not see any performance problem with 60% probability for loss of a frame. For the subrate DS0s with live voice/data traffic, the error correcting capability of GSM codecs will be able to recover from the repeated pattern.

However, when multiple consecutive frames are lost (like in the case of failed links) then while the first scheme will eventually have the same effect (calls will be dropped due to eventual lost synchronization etc.). There will be limited control on which calls will be dropped and every active call will see a performance problem. By using the second scheme for actively detecting link failure and selectively dropping calls, performance problems for calls, which are not dropped, is minimized.

Some of the steps illustrated in FIGS. 2A and 2B may be changed or deleted where appropriate and additional steps may also be added to the flowcharts. These changes may be based on specific communication system architectures or particular networking arrangements or configurations and do not depart from the scope or the teachings of the present invention.

Although the present invention has been described in detail with reference to particular embodiments illustrated in FIGS. 1 through 2B, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of the described elements may be provided as separate external components to communication system 10 or to each other where appropriate. The present invention contemplates great flexibility in the arrangement of these elements as well as their internal components.

In addition, although the preceding description offers a fault and error tolerant protocol to be implemented with particular devices (e.g. aggregation node 22 and cell site element 18), the fault and error tolerant techniques provided may be embodied in a fabricated module that is designed specifically for effectuating the functions provided above. Moreover, such a module may be compatible with any appropriate protocol other than the 8.60 platform, which was offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for providing fault and error tolerance in a network environment, comprising:

an aggregation node associated with a base station controller and operable to receive a packet that includes an error, wherein a portion of the packet is discarded, the packet being associated with a communications flow, the aggregation node being further operable to perform a selected one of injecting a subframe into the communications flow and playing one or more previous frame bits from a frame memory in response to the error, whereby a selected DS0 segment is received from the communications flow and a determination is made whether the segment represents the error.

2. The apparatus of claim 1, further comprising:

a cell site element associated with a base transceiver station and operable to receive one or more packets from the cell site element.

3. The apparatus of claim 1, wherein the subframe that is injected is state dependent.

4. The apparatus of claim 1, wherein the aggregation node further comprises either a stateful algorithm or a stateless algorithm.

5. The apparatus of claim 1, wherein if active voice existed on a channel associated with the packet then a previous subframe is repeated on a corresponding communications link.

6. The apparatus of claim 1, wherein the aggregation node is operable to detect a state associated with the communications flow such that a selected one of an idle pattern, a last subframe pattern, and a next idle start subframe is played on a corresponding communications link.

7. A method for providing fault and error tolerance in a network environment, comprising:

receiving a packet that includes an error;

discarding a portion of the packet, the packet being associated with a communications flow;

performing a selected one of injecting a subframe into the communications flow and playing one or more previous frame bits from a frame memory in response to the error; and receiving a selected DS0 segment from the communications flow; and identifying whether the segment represents the error.

8. The method of claim 7, further comprising:

separating a global system for mobile (GSM) signal corresponding to the communications flow such that the GSM signal is broken into multiple digital signaling zero (DS0) segments.

9. The method of claim 7, wherein if active voice existed on a channel associated with the packet then a previous subframe is repeated on a corresponding communications link.

10. The method of claim 7, further comprising:
detecting a state associated with the communications flow such that a selected one of an idle pattern, a last subframe pattern, and a next idle start subframe is played on a corresponding communications link.

11. Software for compressing data, the software being embodied in a computer readable medium and comprising computer code such that when executed is operable to:
receive a packet that includes an error;
discard a portion of the packet, the packet being associated with a communications flow; and
perform a selected one of injecting a subframe into the communications flow and playing one or more previous frame bits from a frame memory in response to the error, whereby a selected DS0 segment is received from the communications flow and a determination is made whether the segment represents the error.

12. The medium of claim 11, wherein the code is further operable to:
separate a global system for mobile (GSM) signal corresponding to the communications flow such that the GSM signal is broken into multiple digital signaling zero (DS0) segments.

13. The medium of claim 11, wherein if active voice existed on a channel associated with the packet then a previous subframe is repeated on a corresponding communications link.

14. A system for providing fault and error tolerance in a network environment, comprising:
means for receiving a packet that includes an error;
means for discarding a portion of the packet, the packet being associated with a communications flow; and
means for performing a selected one of injecting a subframe into the communications flow and playing one or more previous frame bits from a frame memory in response to the error, whereby a selected DS0 segment is received from the communications flow and a determination is made whether the segment represents the error.

15. The system of claim 14, further comprising:
means for separating a global system for mobile (GSM) signal corresponding to the communications flow such that the GSM signal is broken into multiple digital signaling zero (DS0) segments.

16. The system of claim 14, wherein if active voice existed on a channel associated with the packet then a previous subframe is repeated on a corresponding communications link.

17. The system of claim 14, further comprising:
means for detecting a state associated with the communications flow such that a selected one of an idle pattern, a last subframe pattern, and a next idle start subframe is played on a corresponding communications link.

* * * * *